No. 867,792. PATENTED OCT. 8, 1907.
W. CARMER.
SAW SET.
APPLICATION FILED AUG. 8, 1906.

Witnesses
Phil. E. Barnes
C. C. Hines

Inventor
Wm. Carmer.
By Victor J. Evans
Attorney

THE NORRIS PETERS CO., WASHINGTON, D. C.

UNITED STATES PATENT OFFICE.

WILLIAM CARMER, OF COUDERSPORT, PENNSYLVANIA.

SAW-SET.

No. 867,792.   Specification of Letters Patent.   Patented Oct. 8, 1907.

Application filed August 8, 1906. Serial No. 329,783.

*To all whom it may concern:*

Be it known that I, WILLIAM CARMER, a citizen of the United States, residing at Coudersport, in the county of Potter and State of Pennsylvania, have invented new and useful Improvements in Saw-Sets, of which the following is a specification.

This invention relates to saw-sets, its object being to provide a simple, convenient and inexpensive construction of tool by which the teeth of crosscut and other saws may be quickly and easily set.

Figure 1:
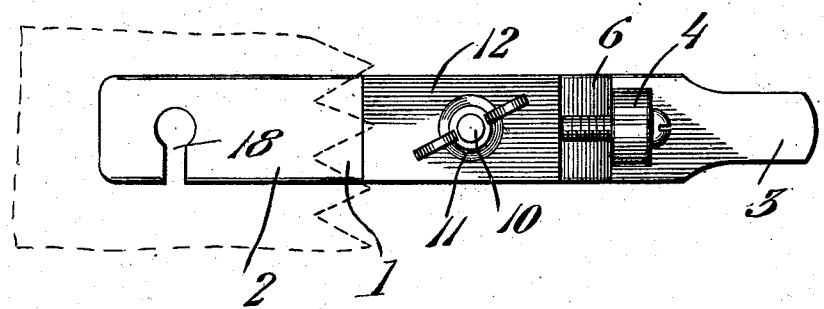
Figure 2:
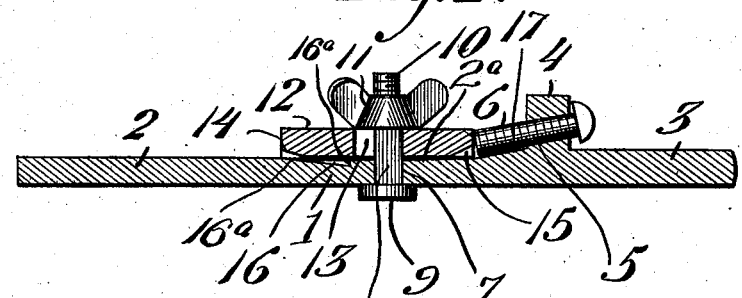
Figure 3:
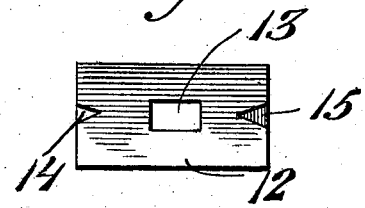

In the accompanying drawings,—Figure 1 is a top plan view of a saw-set embodying my invention. Fig. 2 is a longitudinal section of the same. Fig. 3 is a bottom plan view of the swage or die block.

Referring to the drawings, the numeral 1 designates a substantially oblong rectangular bar forming the body of the tool, one end of said bar being formed with a bed or supporting surface 2 for the saw and the other end thereof reduced to provide a combined handle and striking end 3. Adjacent to the end 3 the body 1 is formed with an upstanding lug 4 having an inclined threaded opening 5 for the reception and passage of a gage and set screw 6.

The intermediate portion of the bar is formed with a rectangular opening 7 for the reception and passage of a correspondingly shaped supporting stem 8 having at its lower end a head 9 to bear against the bottom of the bar and formed with a threaded circular upper end 10 for the reception of a winged clamping nut 11. An oblong rectangular die block 12 rests upon the intermediate portion of the body and is provided with an oblong rectangular slot 13 through which the stem 8 extends, the rectangular form of the slot and stem preventing the die block from having rotary movement while permitting it to be adjusted longitudinally on the body toward and from the lug 4. The die block is adapted to be fastened in adjusted position by the nut 11 and is provided in its under side with setting notches 14—15 at the ends thereof, said notches being of different sizes and varying in shape to set the teeth of a saw to different angular degrees.

Between the bed 2 and opening 7 the upper face of the body is formed with a transverse setting recess 16 coextensive in width therewith, the bottom wall of said recess being inclined downwardly and rearwardly from the face of the body, by which a transverse shoulder 16ª is provided at the rear of the recess, while at the point of intersection of the forward end of said wall and the bed 2 a bending angle 16ª is produced to effect the setting of the tooth. The setting notches 14 and 15 in the ends of the die block 12 are designed to simply receive the points of the teeth to hold the same in position for the setting action, which results by the deflection of the teeth down against the inclined wall 16, the teeth bending at the angle 16ª. The block 12 rests upon a seat 2ª, and at the limit of its forward position has its forward end terminating immediately above the angle 16ª and its rear end terminating at the base or forward end of an upwardly and rearwardly inclined surface 17 leading from the rear end of said seat 2ª to the base of the forward surface of the lug 4.

The forward end of the screw 6 bears against the rear end of the block 12 and holds it from rearward movement and determines its position to effect a proper relation between the notch 16 and the coöperating notch in the die block, and it will be understood that by setting said screw to different positions and relaxing the nut 11 the die block may be adjusted longitudinally on the body to set the coacting notches referred to at different relative positions to swage or set the teeth of a saw at different angles.

The tooth of the saw under treatment projects into the notch 14 or 15, as the case may be, to a sufficient extent only to hold it in position and to enable pressure to be applied to force the same down against the anvil surface 16, the notch in the die block being preferably of a size to receive only the point of the tooth. Owing to the fact that the notches in the die block are not relied upon to bend and set the tooth, which action is caused by the deflection of the tooth down upon the anvil surface 16, it will be understood that the block must be rearwardly adjusted to uncover more or less of the anvil surface to increase the amount of bend or set, as well as to provide for the setting of large teeth. In normal position the die block lies parallel with the seat face 2ª, and in adjusting it rearwardly it is desirable to force its forward end downward against the seat to hold the tooth downward against the anvil surface 16, which progressively increases in depth in a rearward direction. This function is performed by the inclined surface 17, against which the rear end of the block rides as it is adjusted rearwardly, thereby tilting the forward end of the block downward to an increasing extent in its degree of rearward adjustment between the rear end of the seat face 2ª and the lug 4. By this mode of operation the end of the tooth to be set will be firmly held in position against any tendency to upward movement, so that it will be bent accurately down against the anvil surface 16 when the device is forced forward by the stroke of a tool upon the end 3.

The die block is reversible, or may be turned to bring either of its ends in position to coöperate with the notch 16 upon removing the nut 11, detaching and turning the block half way around and again applying the block and fastening it in place by the nut.

In operation, the blade of the saw is rested upon the bed 2 and the tooth to be set inserted into the space between the notches in the body and forward end of the die block, and the end 3 of the body struck with a hammer or other tool, whereby the setting device will be forced forwardly and the tooth deflected into the recess 17 and set at the proper angle. Upon the rearward adjustment of the block for maximum bending or setting or for setting large teeth, which is necessary in order to expose a greater portion of the anvil surface 16 for these operations, the point of the tooth held in the notch 14 or 15 will be retained in position by the downward pressure from the tilting of the block by the inclined surface 17. If the block were moved back on a parallel line with the upper surface of the body, it is apparent that the tooth receiving space would progressively increase to such an extent that the tooth would wedge between the body and block and stick, thus preventing it from being perfectly set, but by the downward movement of the forward end of the block the same degree of space is maintained between the anvil face and upper wall of the setting notch, thus preventing any tendency of the tooth to shift and stick. When the end 3 of the body is struck by a hammer or other tool, the pressure is directed endwise against the point of the tooth, causing the tooth to bend downward against the anvil face between its tip and the angle 16$^a$. As a result, the tooth will be set at the correct angle from the point inward, so that a saw having its teeth set by my improved device will cut in a free and easy manner.

The portion 2 of the body is provided with a key hole slot 18 opening through one of its side edges, forming a setting portion to straighten bent raker teeth.

Having thus described my invention, what I claim is:—

1. A saw-set comprising a body provided with a downwardly and rearwardly inclined setting recess, a die block provided in its end with a notch to receive the point of a tooth, said block being adjustable to set the notch above the recess at any point along the length thereof, means for securing the block in adjusted position, and means for tilting the block to progressively force its notched end downward in its rearward adjustment.

2. A saw-set comprising a body provided with a downwardly and rearwardly inclined setting recess, a block adjustable longitudinally of the recess and provided in one of its ends with a coacting notch to receive the point of a saw tooth, means for securing the block in adjusted position, an adjustable contact device for limiting the rearward movement of the block, and means for tilting the block to progressively force its notched end downward in its rearward adjustment.

3. A saw-set comprising a body provided with a downwardly and rearwardly inclined setting recess, a lug arranged in rear of said recess, and an upwardly inclined surface located adjacent said lug, a die block adjustable toward and from the lug and provided in its forward end with a notch to receive the point of a tooth, fastening means for securing the block in adjusted position, and a set screw supported by the lug and adapted to engage the rear end of the block.

In testimony whereof, I affix my signature in presence of two witnesses.

WILLIAM CARMER.

Witnesses:
W. B. HEMPHILL,
F. A. PERKINS.